United States Patent [19]
Hershey et al.

[11] Patent Number: 5,793,753
[45] Date of Patent: Aug. 11, 1998

[54] TELECOMMUNICATIONS NETWORK MANAGEMENT OBSERVATION AND RESPONSE SYSTEM

[75] Inventors: Paul C. Hershey, Manassas; Jeffrey L. Stoltzfus, Falls Church, both of Va.

[73] Assignee: Coherent Communications Systems Corp., Leesburg, Va.

[21] Appl. No.: 714,865

[22] Filed: Sep. 17, 1996

[51] Int. Cl.$^6$ ...................................................... H04J 1/16
[52] U.S. Cl. ............................................................ 370/252
[58] Field of Search .................................. 370/252, 241, 370/245, 247, 249, 254, 256, 257, 395, 389, 401, 402, 404, 405, 407, 408, 464, 465, 466, 467, 468, 474, 477; 395/200.36, 200.64, 566; 340/825.03, 825.02, 825.01

[56] References Cited

U.S. PATENT DOCUMENTS

| 5,047,918 | 9/1991 | Schwartz et al. | 395/619 |
| 5,604,805 | 2/1997 | Brands | 380/30 |

*Primary Examiner*—Dang Ton
*Attorney, Agent, or Firm*—Dann, Dorfman, Herrell and Skillman, P.C.

[57] ABSTRACT

A system for monitoring and managing the operations of a multi-technology telecommunications network is disclosed. The system includes programmable probes operatively connected to a network for monitoring data transfer activity on the network and collecting selected data relating to one or more relevant functions. A workstation interpreter is programmed for (1) receiving input from a system manager identifying the type or types of parameters that are to be monitored, (2) providing appropriate commands to program the programmable probe to effect collection of data relative to the selected parameter, and (3) receiving and storing the parameter data from the probe. The probe hardware is selected for compatibility with the network technology with which it is associated and it is programmed with the appropriate protocols to facilitate communications with the associated technology. The probe and the workstation interpreter are programmed with appropriate management protocols to facilitate communication therebetween. The workstation interpreter is programmed to interpret received data by evaluating a received parameter and providing an indication when the parameter value deviates from a reference value by more than a preselected threshold. The workstation interpreter is further configured to effect a configuration change to the telecommunications network. The configuration change is selected to correct a network condition that caused the monitored function parameter to deviate from the reference value by more than the preselected threshold.

4 Claims, 4 Drawing Sheets

TELECOMMUNICATIONS NETWORK MANAGEMENT OBSERVATION AND RESPONSE SYSTEM

FIELD OF THE INVENTION

This invention relates to telecommunications networks and in particular to a system for providing real time monitoring and management of the configuration, operations, functions, and services of such networks.

BACKGROUND OF THE INVENTION

The known telecommunications networks, and those planned for the foreseeable future, include mixed technologies that employ different protocols and operate to provide multiple functions simultaneously. Wireline networks interconnect LAN's, MAN's, and WAN's, as well as broadband networks (SONET, SDH, ATM, etc.), FDDI networks, T1/E1 lines, CATV, and the INTERNET. The advent of personal wireless communications has brought large wireless networks that are interconnected with the wireline networks. Furthermore, the increasing utilization of satellite communications (e.g., GPS) has led to the interconnection of satellite communications networks with wireline and or wireless networks. The resulting multi-technology, multi-function networks are referred to as "KLUDGE" networks. FIG. 1 illustrates a sampling of the variety of communications technologies that can be present in a "KLUDGE" network. Such a network includes at least an equal variety of information transfer protocols.

As the complexity of telecommunications networks increases, the management of such networks necessarily becomes more complex. In the past, network management has been limited to out-of-band, i.e., non-real time, identification of and response to one or more network conditions. However, in response to customer demands, it has now become necessary to manage networks in-band, i.e., in real time, not only with regard to alarm or error conditions, but also for quality of voice and/or data, system utilization, and customer and system security. Presently, there is no known in-band, real time, telecommunications network management system that provides a unified method or system for monitoring and managing a comprehensive set of network functions and services for wireline, wireless, and satellite networks, as well as networks that combine those technologies. The known network management systems are usually limited to one or two subsets of the "KLUDGE" network. Such systems are not easily adaptable to additions to and/or deletions from the network.

A key consideration in creating a flexible and easily adaptable network management system is the location of the probes that collect the desired information about the system. It is preferable that such probes be nonintrusive and passive. Another important consideration is flexibility in the monitoring of network resources and utilization. Information that is needed by a network manager at one supervisory level or at one subset of the network may be irrelevant or superfluous to another network manager at another supervisory level or subset of the network. It would be highly desirable to have a network management system that is both distributed and centralized so as to provide local and global monitoring and management of the network. Moreover, the interface between the system or subsystem manager should be comprehensive, but easy to use. Preferably, it should be capable of being implemented on a general purpose computer such as a PC workstation.

Because of the dynamic nature of modern-day telecommunications networks, the acquisition of network performance data is time critical. The known network management systems do not provide system performance data in real time, nor are they capable of effecting corrective changes to the network operating parameters in real time when an alarm or other problem condition arises. In view of the current state of the art, it would be highly desirable to have a network management system that operates in real time mode.

SUMMARY OF THE INVENTION

The shortcomings of the known network management systems are overcome to a large degree by a system for monitoring and managing the operations of a telecommunications network in accordance with the present invention. The network monitoring and management system of this invention includes a programmable probe operatively connected to a network device for monitoring data transfer activity on the network and collecting selected data relating to one or more relevant functions. The selected data represents information about the relevant function. Among the relevant functions are alarm conditions, accounting information, network security, network configuration, network performance, and combinations thereof. In order to permit the probe to communicate with the network device, a first communication means is provided for establishing an appropriate communication link between the programmable probe and the network device. A general purpose computer is programmed for (1) receiving an input from a user identifying the type or types of parameters that are to be monitored, (2) providing appropriate commands to program the programmable probe to effect collection of data relative to the selected function parameter, and (3) receiving and storing the function parameter data from the probe. To permit the probe to communicate with the computer, a second communication means is provided for establishing a communication link between the computer and the programmable probe. An input device such as a keyboard and/or mouse is operatively connected to the computer for the user to enter the parameter selections. A data output device is operatively connected to the computer for providing the parameter data to the user.

In accordance with another aspect of the present invention, the system includes an interpreter that interprets the received data. The interpreter evaluates a received parameter to provide a parameter value. It compares the parameter value to a reference value and provides an indication when the parameter value deviates from the reference value by more than a preselected threshold.

In accordance with a further aspect of the present invention, the system includes response means that is responsive to the interpreter. The response means operates to effect a change or changes in the network in response to the result provided by the interpreter. In this manner and out-of-spec condition or other significant deviation on the network can be automatically corrected.

BRIEF DESCRIPTION OF THE DRAWINGS

The foregoing summary as well as the following detailed description of the present invention and a preferred embodiment thereof, will be better understood when read in conjunction with the appended drawings, wherein.

DETAILED DESCRIPTION

Figure 1:
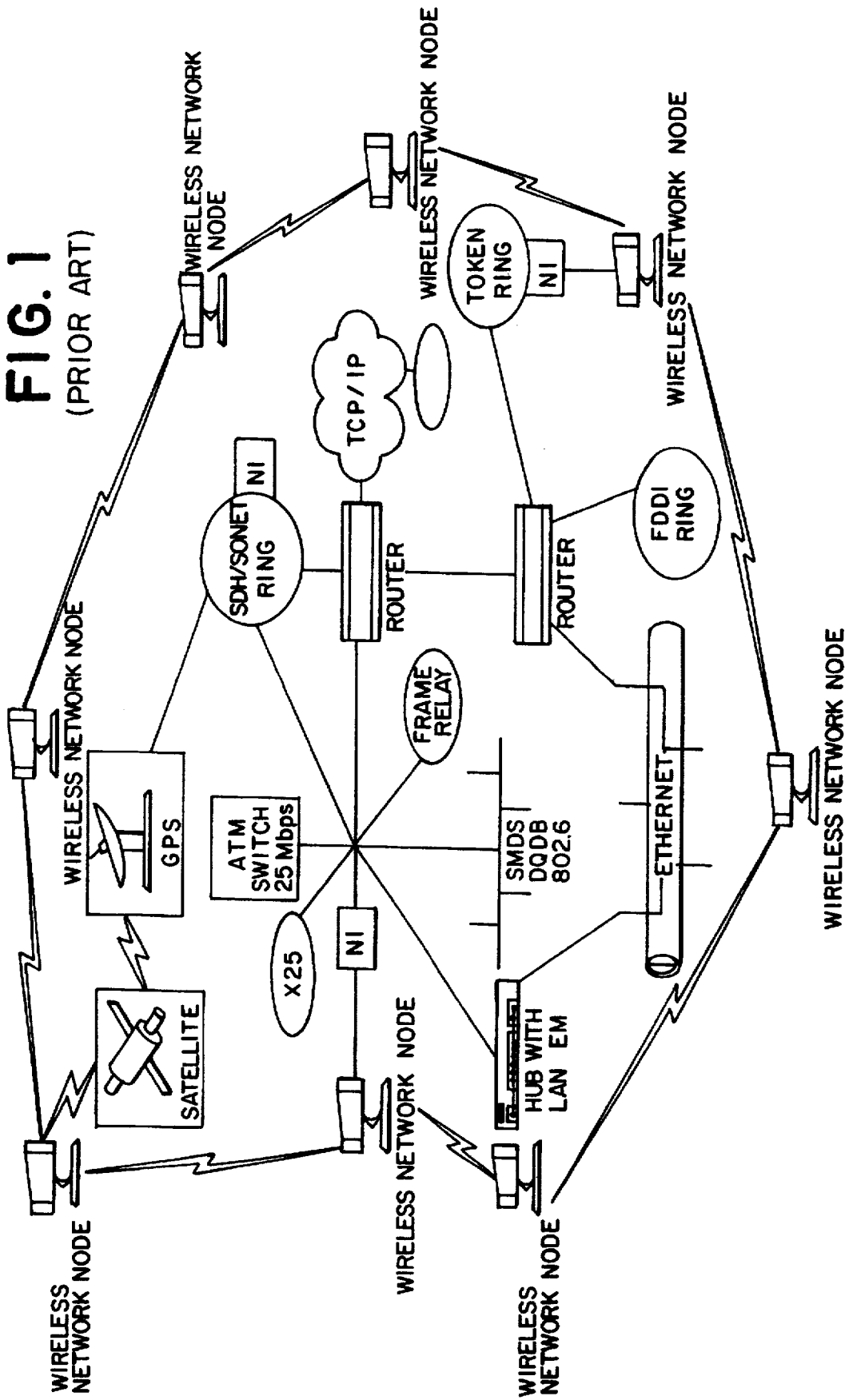
FIG. 1 is a schematic diagram showing a multi-technology network of the type presently known in the art.
Figure 2:
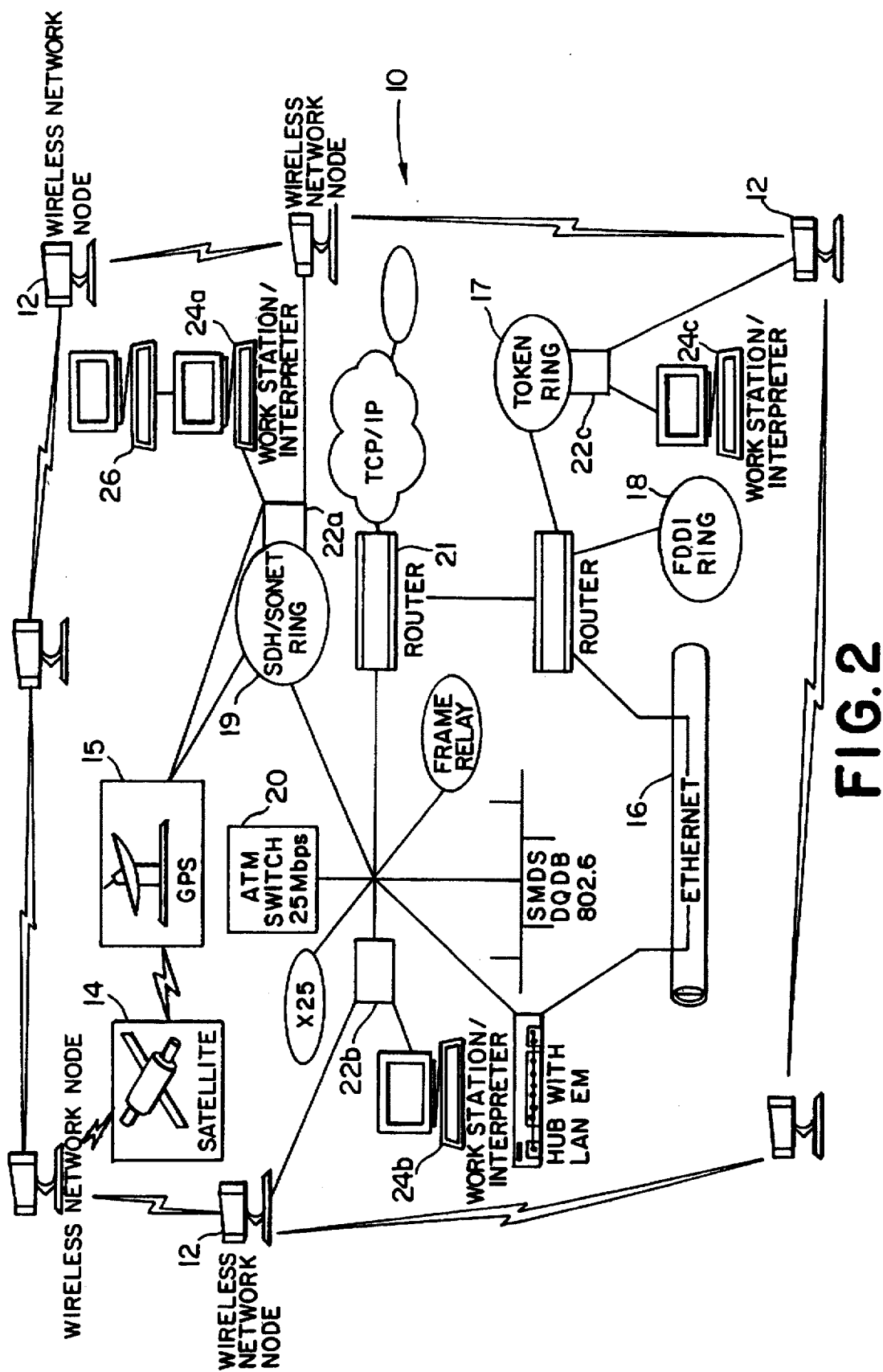
FIG. 2 is a schematic diagram showing a multi-technology network that incorporates a network management system in accordance with the present invention.

Referring now to FIG. 2, there is shown a multi-technology network 10, of the type to which the present invention is directed. The network 10 is composed of a plurality of subnetworks or subsystems associated with a variety of technologies. As shown in FIG. 2, network 10 includes a wireless network 12 such as a personal communication service network, and/or a satellite communications network 14, including a global positioning system (GPS) 15. Network 10 also includes various wireline technologies such as local area networks (LAN's) and wide area networks (WAN's), incorporating an ethernet 16, token ring 17, and/or native mode LAN interconnection service (not shown), a fiber distributed data interface ring (FDDI) 18, and one or more broadband network systems 19 such as a synchronous optical network (SONET) and/or a network based on the synchronous digital hierarchy (SDH). Network 10 may also include data routing devices such as an asynchronous transfer mode (ATM) switch 20 or a router 21.

A network monitoring and management system in accordance with the present invention includes strategically located probes or arrays of probes 22a, 22b, 22c, for collecting data from devices in the various technologies that constitute the network. The probes include hardware and software programmability in order to provide flexibility in the face of dynamically changing network conditions, such as changing network configurations and utilization of the network. The probes are also programmable to effect changes in various aspects of the network configuration as the need may arise. More specifically, the probes are located within such devices as echo cancellers, routers, ATM switches, gateway devices, ethernet hubs, or any other type of device which is usually present in the network hardware and has access to data transfer activities on the network.

Associated with the probes or probe arrays 22a, 22b, 22c are interpreter workstations 22a, 22b, 22c, respectively, which are programmable to communicate with one or more of the probes. The workstations operate under control of a graphical user interface that permits the system manager to program the probes to collect network performance data, network configuration parameters, alarm condition data, network accounting data, and data related to network security. The workstation interpreter processes the data received from the probes to provide the data to the system manager in an easily viewable format. Moreover, the workstation interpreter can be used by the system manager to change or reset various network configuration parameters such as alarm set points. The workstation interpreter includes software that evaluates parameters received from the network probe to provide a parameter value represented thereof. The parameter value is preferably a numerical value that is computed from a formula or it may be the exact numerical value of the received parameter. The interpreter software compares the parameter value to a reference value which is stored in a look-up table or other data storage method to determine whether the numerical value deviates from the reference value by more than a preselected threshold. If the comparison is positive, then the interpreter provides an out-of-threshold indication to the network manager by an appropriate display. In a further embodiment of the present invention, the workstation software is responsive to the out-of-threshold indication for automatically effecting a configuration change to a device on the telecommunications network. The configuration change is effective to correct the condition that caused the monitored function parameter to deviate from the reference value by more than the preselected threshold.

The workstation interpreters 22a, 22b, 22c, are strategically located in the network to provide for distributed network monitoring and management. A centralized workstation interpreter 26, which is located at a central office or network headquarters, is programmable to communicate with each of the distributed workstation interpreters. Communication is effected over the telephone network via modem, over a LAN or WAN, or other network configuration. In this manner the network can be monitored and managed from a central location as well as from the distributed workstations, when desired.

The network probe used in the network management observation and response system of the present invention includes hardware and software aspects. The hardware consists of a programmable device such as a programmable gate array or microprocessor having a random access memory (RAM). The selection of the type of programmable device used is dependent on the network technology with which the probe is associated. Selection of the programmable device is technology dependent because of the differing protocols associated with the various technologies used in communication networks. Persons skilled in the art will be able to readily determine the appropriate programmable device for a particular technology.

The programmable device is programmed with one or more suitable network protocols to permit it to obtain desired information from the network technology with which it is connected. The programmable probe is also programmed with suitable management protocols to enable it to communicate with the workstation interpreter. A real time operating system is used in connection with the appropriate network protocol software and the management protocol software to provide for real time processing of the desired information.

The network probe is programmed to monitor a number of network functions and conditions including configurations, faults, performance, accounting, and security. Network configuration includes such parameters as network signaling and VT1.5 mapping for SONET. Network fault parameters are those that could indicate an alarm condition such as CRC errors, basic error rate (BER), and/or loss of signal (LOS). Network performance parameters of interest include transmission delay time and the percent of the network resources being utilized at a given time. Accounting parameters include those factors that relate to customer utilization in order to properly bill customers for services actually used. Security parameters that are of concern include passwords for the monitoring system itself, for access to network configuration data, and possible breaches of network integrity by unauthorized persons.

Figure 3:
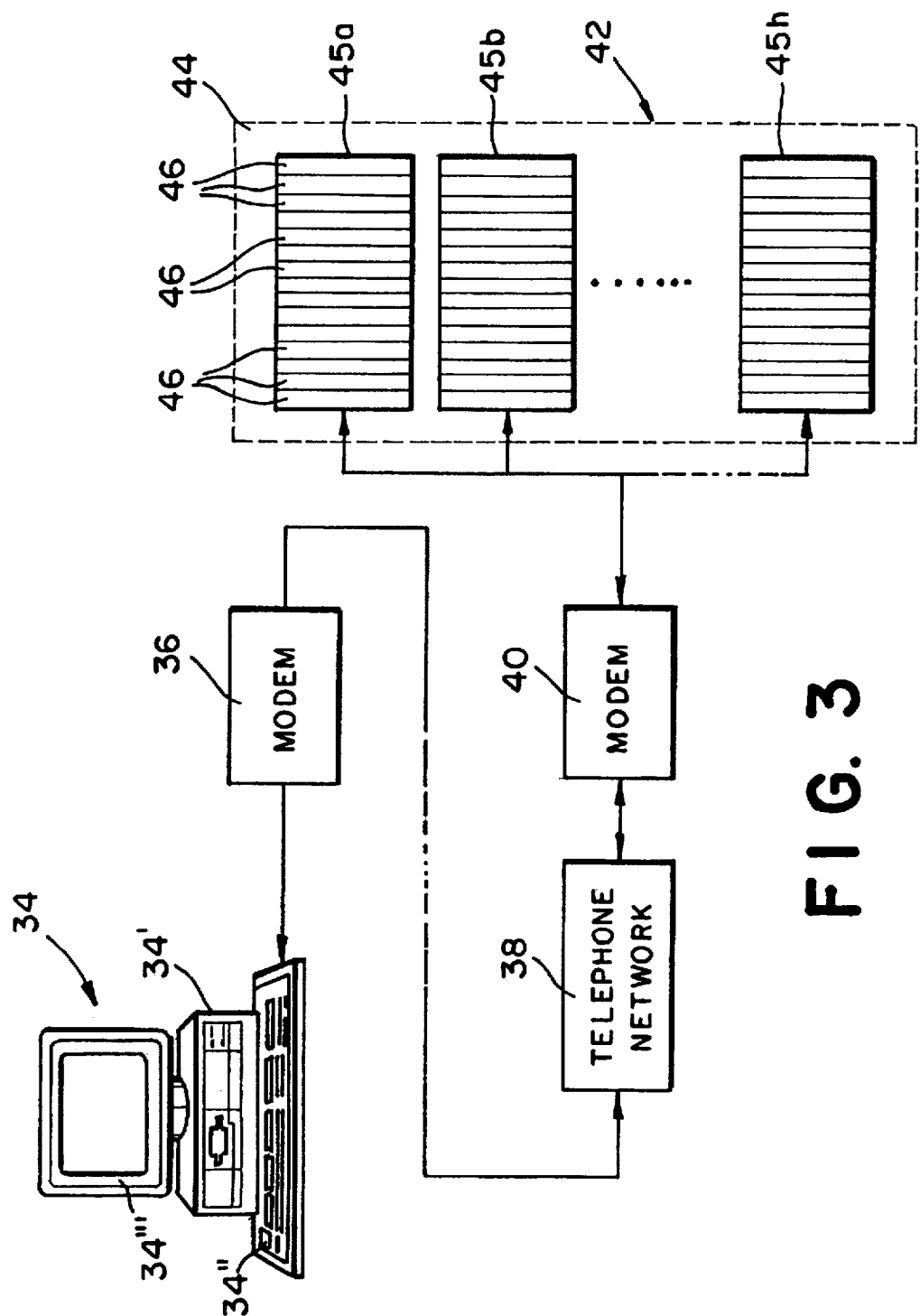
FIG. 3 is a schematic diagram showing a preferred arrangement for some of the hardware of the network management system shown in FIG. 2.

Some of the unique aspects of the network monitoring and management system in accordance with the present invention can be better understood from the following description of a preferred embodiment thereof. Referring now to FIG. 3, there is shown a workstation interpreter 34 embodied as a PC having a central processing unit 34', a keyboard 34" for the entry of commands and requests, and a monitor 34'" for displaying information that has been processed by the central processing unit 34'. The workstation 34 is connected through a modem 36 to the telephone network 38 for communicating with a second modem 40 associated with an array of echo cancellers 42. The array of echo cancellers 42 is composed of one or more banks or racks 44, each containing a plurality of shelves 45a–45h. Each shelf contains a plurality of multichannel digital echo cancellers 46 (digroup). A preferred embodiment of the echo canceller array is the EC6000 Echo Canceller System manufactured by Coherent Communication Systems Corporation. The echo canceller array 42 is associated with a telecommunications network or with a subset of a larger communications network. Each of the echo cancellers 46 is equipped with a programmable probe that is programmed to collect one or more parameters that relate to various functions performed by the echo cancellers in connection with data transfer activity on the network channel or channels with which its echo canceller is associated. The programmable probe is also programmed to communicate the collected parameter values to the workstation 42 through the modem hook-up. It will be appreciated that the workstation can be directly connected to the echo canceller array 42 through the RS-232 serial port of the workstation or can be connected through a LAN or WAN.

The network management software operates to establish a communication link between the echo canceller probes and the workstation interpreter 42 through the modem hook-up. The network management software includes both workstation software and communication control software. The latter is used to control all the echo cancellers in a shelf of the echo canceller bank. The workstation software provides a variety of screen displays that permit the network manager to monitor and configure the echo canceller hardware through a graphical user interface (GUI). The workstation software permits the manager to set, view, and change the desired parameters from various vantage points in the hierarchy (shelf, digroup, and channel) of the echo canceller array. The workstation software is modular and compatible with known PC operating environments such as the Windows operating interface.

Figure 4:
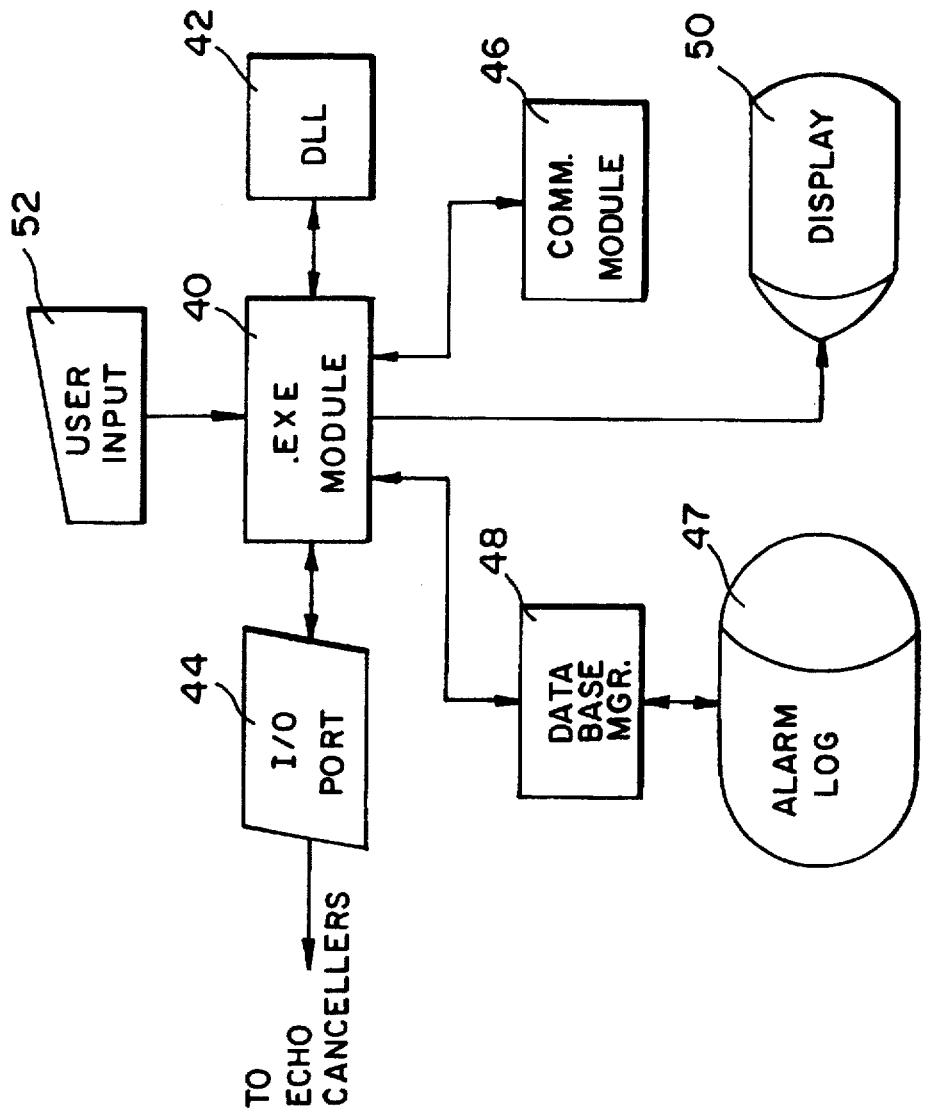
FIG. 4 is a schematic diagram showing a preferred configuration for the software used with the hardware shown in FIG. 3.

A preferred embodiment of the basic software modules that constitute the network management system GUI is shown schematically in FIG. 4. An executable module (.EXE) 40, preferably written in the Visual Basic programming language is the primary module. The .EXE 40 generates function calls to a Windows dynamic link library module (DLL) 42 preferably written in the C++ programming language. The DLL 42 generates commands which it transmits to the echo canceller array through the RS-232 serial port 44 and over the modem hook-up. The commands are transmitted using a serial communications module 46 such as the MicroHelp Communications Library. The .EXE module 40 receives responses to the commands through the serial port 44 and sends them to the DLL 42 for parsing and storage. Alarm event data are maintained in an alarm log 46 in the form of a relational database. A database manager 48, such as the MICROSOFT ACCESS database manager, is used to permit querying, sorting, and reporting of data contained in the alarm log 46. The requested information is displayed on the screen of a display device 50 and/or printed for later reference.

The .EXE module 40 retrieves the responses transferred to the DLL 42 and provides the information to the display device 50 so that the user can view the information in graphical and textual formats. The workstation software allows the user to graphically navigate the various elements of the echo canceller array and to view preselected parameters of the various hierarchy levels (shelf, digroup, and channel). The .EXE module includes an automatic refresh timer, which queries the echo cancellers at regular intervals through the DLL module in order to update any monitored parameters that have changed and to log any alarms that have occurred since the previous query. Dialog screens are provided to permit the user to configure the various echo canceller parameters, to confirm that such requests were successfully effected, and to change various settings relating to operation of the GUI software. The software also provides the capability to define, save, and print report files relating to any of the monitored echo canceller parameters. The user enters queries for information, navigation commands, and parameter changes through an input device 52 such as a keyboard and/or mouse.

In view of the foregoing description and the accompanying drawings, some of the novel features and advantages of the network management observation and response system according to the present invention are now apparent. For example, a telecommunications network management system has been described which provides passive, non-intrusive monitoring of network activity through the use of programmable probes strategically located in the network. The probes work in conjunction with one or more workstation interpreters that are located at distributed sites and/or at a central location to provide both distributed and centralized management. The probes and the workstation interpreters are configured to operate to obtain and display network information.

The disclosed network management observation and response system is modular in design to provide significant economies in installation and maintenance. The system has the flexibility to accommodate a variety a communications technologies as well as a variety of network and management protocols. It provides the capability to monitor several network functions including network configurations, faults, performance, customer accounting, and security. An easy-to-use yet comprehensive graphical user interface is provided to facilitate the observation of monitored parameters, interpret the significance of the observed parameters, and effect network changes in response to abnormal network conditions.

The terms and expressions which have been employed are used as terms of description and not of limitation. There is no intention in the use of such terms and expressions of excluding any equivalents of the features shown and/or described, or portions thereof. It is to be recognized that various modifications are possible within the scope of the invention claimed.

What is claimed is:

1. A system for monitoring and managing a telecommunications network comprising:

a programmable network probe operatively connected to a telecommunications network device for monitoring data transfer activity on said telecommunications network device and for collecting a selected function parameter relating to said data transfer activity;

first communication means for providing a communication link between said programmable network probe and said telecommunications network device;

computer means programmed for (1) receiving the selected function parameter from a user, (2) providing appropriate commands to program said programmable network probe to obtain the selected function parameter, and (3) receiving and storing the function parameter obtained from the telecommunications network device;

second communication means for providing a communication link between said computer means and said programmable network probe;

input means operatively connected to said computer means for the user to enter the selected function parameter; and output means operatively connected to said computer means for providing data to the user relative to the selected function parameter.

2. The system according to claim 1 wherein the selected parameter is selected from the group consisting of an alarm condition, an accounting parameter, a security parameter, a network configuration parameter, a network performance parameter, and a combination thereof.

3. The system according to claim 1 comprising interpreter means responsive to the received function parameter for (1) evaluating the received parameter to provide a parameter value, (2) comparing the parameter value to a reference value, and (3) providing an indication when the parameter value deviates from the reference value by more than a preselected threshold.

4. The system according to claim 3 comprising response means responsive to the indication generated by said interpreter means for effecting a configuration change to a device on the telecommunications network that is sufficient to correct a network condition that caused the monitored function parameter to deviate from the reference value by more than the preselected threshold.

* * * * *